(No Model.)
A. H. HOYT.
GALVANOMETER.
No. 532,559. Patented Jan. 15, 1895.
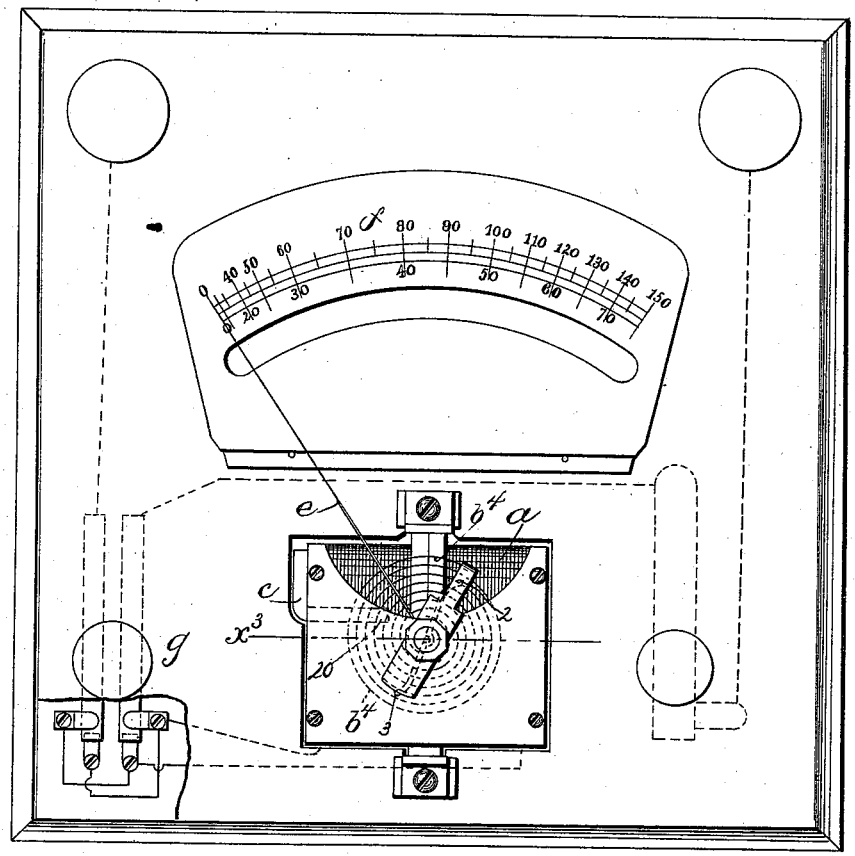
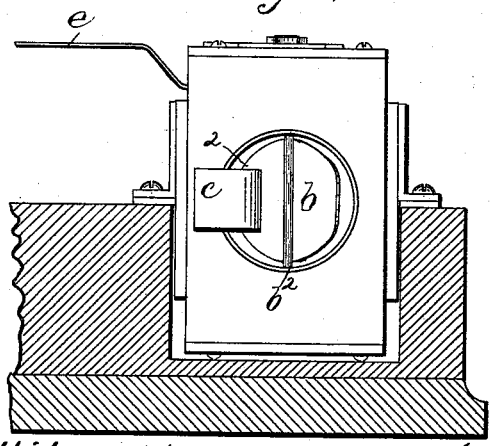
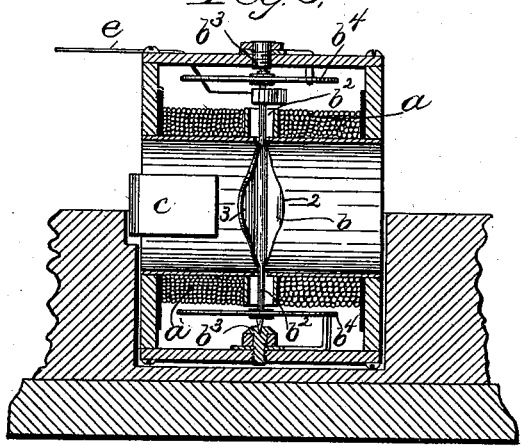
Witnesses
Jas. J. Maloney.
J. P. Livermore.
Inventor,
Adrian H. Hoyt.
by Jos. P. Livermore
Att'y.
THE NORRIS PETERS CO., PHOTO-LITHO., WASHINGTON, D. C.

UNITED STATES PATENT OFFICE.

ADRIAN H. HOYT, OF PENACOOK, NEW HAMPSHIRE, ASSIGNOR TO THE WHITNEY ELECTRICAL INSTRUMENT COMPANY, OF SACO, MAINE, AND MANCHESTER, NEW HAMPSHIRE.

GALVANOMETER.

SPECIFICATION forming part of Letters Patent No. 532,559, dated January 15, 1895.

Application filed April 25, 1894. Serial No. 508,930. (No model.)

*To all whom it may concern:*

Be it known that I, ADRIAN H. HOYT, of Penacook, county of Merrimac, State of New Hampshire, have invented an Improvement in Galvanometers, of which the following description, in connection with the accompanying drawings, is a specification, like letters and figures on the drawings representing like parts.

My invention relates to galvanometers or electrical indicating instruments used in determining the amount of current flowing in a circuit at a given time.

The device embodying my invention may be used equally well in indicating alternating currents or direct currents, and depends for its operation largely upon the magnetic or inductive influence of such currents upon a movable needle or armature of novel construction as will be pointed out, the tendency of a magnetic needle under such influence being as is well known to assume a position at right angles to the conductor through which the current is flowing. Since the said magnetic influence increases in force as the current increases in amount the amount of current may be determined by applying to the needle a constantly increasing force, such as that of a spring, opposed to the force due to said magnetic influence, and observing the position of the needle when acted upon by said opposing forces.

The invention also embodies means for utilizing in addition to the above described magnetic or inductive force, the forces of mutual attraction and repulsion between two magnetic bodies, under the inductive influence of the current which is to be indicated or measured, as will be fully described hereinafter.

The arrangement of parts by which the forces above described are utilized, is as follows: A movable needle or armature of normally non-polarized magnetic material and in the form of a thin plate or disk, is suspended or pivoted within a coil or solenoid so that it stands normally at an angle with the axis thereof but is movable into line with said axis under the influence of the current flowing in the solenoid, such movement being opposed by a constantly increasing force such as that of a spring. In order to indicate to the observer the extent of movement of said armature, a pointer is attached thereto adapted to co-operate with a suitably calibrated scale. It is found, however, in calibrating the scale for such an instrument that the increments of current strength are not directly proportional to the increments of movement of the armature against a constantly increasing force, so that the graduations are unequal, growing more minute toward the higher numbers, and thus rendering that part of the scale illegible. This difficulty may be overcome by utilizing other forces due to the magnetic effect of the current in addition to the principal force (*i. e.* that induced directly by the current in the solenoid) tending to move the needle, and so applying said forces as to produce a compensating effect upon the movement of the needle. For this purpose an additional normally non-polarized magnetic body is placed in the magnetic field of the solenoid with one of its ends in inductive proximity to the movable needle or armature and the other at some distance therefrom. The said movable needle is so arranged that as it moves one end of it recedes from the said fixed magnetic body, or pole piece as it may be called, while the other approaches the said pole piece. If therefore, the solenoid is energized by the current, both the said pole piece and the needle become polarized and the said parts are so placed with relation to the coil that the end of the pole piece which is near the needle and the end of the needle which is then (*i. e.* before or at the beginning of its movement) nearer the pole piece receive the same polarity while the opposite end of the needle receives the opposite polarity. Since like poles repel, the magnetic force tends to move the nearer end of the needle away from the pole piece, and as the needle moves its opposite end approaches the pole piece and the force of attraction between unlike poles is thus brought into effective action with a tendency to continue the movement. Since both the pole piece and the needle are normally neutral the relative polarity induced in them will be the same whichever may be the direction of the current in the inducing coil, and the polarity of both pieces will be reversed simultaneously when acted upon by an alternating current so that the relation of like and unlike of the poles will remain the same and the forces of attraction or repulsion will have the same relation to each other during the alternations of the current, the pieces of magnetic material being so proportioned as to respond substantially simultaneously to the changes in polarity of current. When the instrument is used with direct currents therefore, their direction through the inducing coil may be reversed to neutralize residual magnetism or to show if the readings have been affected by residual magnetism in the stationary and movable magnetic pieces, and the readings corresponding to the opposite polarity of the current may be observed and compared, and if found to disagree the mean may be taken as the correct reading.

By the arrangement above outlined the increments of movement for a comparatively large current will be quite large and the graduations of the indicating scale may be more nearly uniform than with most instruments of this kind, although they may not be absolutely uniform in any part of the scale, which may be graduated experimentally.

Figure 1 is a plan view of an electric indicating instrument embodying this invention, with the inclosing case for the working parts removed. Fig. 2 is an end elevation of the inducing coil, showing also the needle, and parts co-operating therewith; Fig. 3, a section through the axis of the coil on line $x^3$ Fig. 1, and Fig. 4 a plan view of the movable armature or needle, as seen looking toward the end of its pivotal axis, and the pole-piece in its position relative thereto.

The instrument is composed essentially of an inducting coil or solenoid $a$ for the current to be measured, a neutral armature or needle $b$ mounted on an arbor $b^2$, pivoted in bearings $b^3$ so that the armature $b$ may turn on an axis at right angles to the axis of the coil $a$ and a core or pole piece $c$ of soft iron or normally neutral material adapted to be magnetized by the current in the inducing coil $a$. The needle $b$ is also acted upon by a retractive force shown as that of a spring or springs $b^4$, acting on its arbor $b^2$ and tending to hold the said needle normally about at right angles to the axis of the coil $a$ and to oppose a gradually increasing resistance to the pivotal movement of said needle from its normal or starting position at right angles to the axis of the coil to a position parallel with the axis of the coil. The arbor $b^2$ of the needle is provided with a pointer $e$ which co-operates with a suitably graduated scale $f$ to indicate the angular movement of the needle, or rather the positions at which it arrives under the action of the opposing force of the spring $b^4$ on the one hand, and the forces due to the action of the current in the coil $a$ on the other hand. The best results have been attained by making the needle or armature $b$ as a thin plate of substantially disk-shape, and also slightly curved at the polar extremities, as shown in Fig. 4, and the coil $a$ wound in the form of a cylinder surrounding said disk as clearly shown in Fig. 2. By making the said plate as thin as possible the mass of magnetic material is reduced to the utmost extent, thus increasing the rapidity with which the armature may be magnetized and demagnetized or in other words, decreasing the magnetic lag. Moreover by making the said armature in the shape of a disk and mounting it on an axis parallel to its own plane the said axis passing through the neutral portion of the armature or midway between its polar extremities, it is obvious that the greater portion of the magnetic material forming the said armature will be in the neutral part thereof, and decrease toward the polar extremities. Substantially the same result might be attained with other shapes departing somewhat from that of a true disk, and it is to be understood therefore, that the word "disk" is used herein to include such shapes as would embody the qualifications above described.

The stationary core or pole piece $c$ is arranged at one side of the plane through the axis of the needle and coil as shown in dotted lines Fig. 1, and preferably terminates near the plane through the axis of the needle at right angles to that of the coil, as shown, thus bringing the extremity of the pole piece $c$ near to one end of the needle $b$ when in its normal position (the zero position of the pointer $e$) and so that the said nearer end of the needle recedes from the adjacent end of the piece $c$ and the needle turns on its pivot, while the same movement continued brings the other end of the needle gradually into closer proximity to the end of the pole piece $c$. With this arrangement the current through the coil $a$ in addition to its tendency to turn the needle $b$ toward a plane parallel to its own axis, tends to magnetize the said needle $b$ and pole piece $c$ and if the current flows in such direction as to make the polar extremity 2 of the needle $b$ for example, north polarity, it will make the end 20 of the pole piece $c$ also of north polarity and there will consequently be the force of repulsion developed between the poles 2 and 20 of the movable and stationary pieces respectively, which will tend to aid the inductive effect of the coil in turning the piece $b$ on its axis, this tendency decreasing however, as the needle continues to turn and the said poles recede from each other. By the continued movement of the needle however, the opposite polar extremity 3 will be brought nearer the end 20 of the pole piece $c$ and these parts being of opposite polarity the forces of attraction will be developed between them with increasing effect as the movement continues, thus providing an increasing auxiliary to the inductive effect of the coil in moving the needle $b$ in the same direction. The said pole piece thus arranged with relation to the movable armature or needle consequently produces forces of attraction and repulsion, which acting as above described tend to compensate for the indirect ratio between the increments of current strength and the increments of movement of the armature, as the latter responds to the inductive effect of the current flowing through the coil, so that the movement of the needle against the constantly increasing resistance of the springs $b^4$ will be very nearly proportional to the strength of the current thus bringing the graduations in the different parts of the scale $f$ sufficiently near equality to make all parts of the scale legible.

It makes no difference what the actual direction of the current is, as the needle $b$ and pole piece $c$ being neutral will be magnetized in such manner by the inductive effect of the current that the poles 2 and 20 will be unlike, and the poles 3 and 20 will be alike whatever may be their actual polarity. The instrument may therefore be used with alternating currents or with direct currents; and when used with the latter, readings may be taken with the current flowing in opposite directions through the coil, a reversing switch $g$ being provided for this purpose. The two readings may then be compared to detect if the instrument is affected by residual magnetism, and if the readings disagree a mean between them may be taken as the correct reading.

While the arrangement of parts herein shown and described has been found effectual in carrying out the invention, the invention is not necessarily limited thereto as it is obvious that variations might be made to attain the same end, without departure from the substantial features of construction and operation of the instrumentalities hereinbefore described.

I claim—

1. The combination with a solenoid of a needle within said solenoid, said needle being pivoted on an axis parallel to its own plane and perpendicular to the axis of the said solenoid, and a core or pole-piece also under the inductive influence of said solenoid, and extending into inductive proximity to said needle, as set forth.

2. The combination with a solenoid, of a needle or armature within said solenoid, and movable on an axis parallel to its own plane and perpendicular to the axis of said solenoid, and a core or pole-piece having its polar extremity at one side of the plane through the axis of the solenoid and the needle, and terminating near one polar extremity of the needle, as and for the purpose set forth.

3. An electrical indicating device comprising a solenoid, a normally neutral or non-polarized armature or needle pivoted midway between its polar extremities on an axis parallel to its own plane and perpendicular to the axis of the solenoid and within the said solenoid, a constantly increasing force opposing the movement of the needle, a pointer carried by said needle and cooperating with a suitably graduated scale, and a normally neutral magnetic core or pole piece adapted to be polarized by a current flowing through said solenoid and having one of its polar extremities in inductive proximity to said needle or armature substantially as and for the purpose set forth.

4. In an electrical indicating device, the combination with the solenoid, of a movable armature or needle comprising a thin plate of soft iron pivotally supported within said solenoid on an axis parallel to its own plane and perpendicular to the axis of said solenoid, substantially as described.

5. In an electrical indicating device, the combination with a solenoid, of an armature or needle in inductive proximity thereto, the said armature or needle consisting of a thin plate of soft iron pivoted on an axis parallel to its own plane, and perpendicular to the axis of said solenoid substantially as described.

6. In an electrical indicating device, the combination with a solenoid, of a movable armature or needle comprising a thin disk of soft iron curved or bent at its polar extremities, and a stationary pole piece in inductive proximity to both said solenoid and said armature, substantially as described.

In testimony whereof I have signed my name to this specification in the presence of two subscribing witnesses.

ADRIAN H. HOYT.

Witnesses:
J. ALBERT MASSIE,
HORACE D. BEAN.